United States Patent
Singh et al.

(10) Patent No.: US 12,150,023 B2
(45) Date of Patent: Nov. 19, 2024

(54) ENHANCED NETWORK CONNECTIVITY FOR A CONNECTED CAR AND ONBOARD USER EQUIPMENT

(71) Applicant: Apple Inc., Cupertino, CA (US)

(72) Inventors: Ajoy K Singh, Milpitas, CA (US); Sai Sravan Bharadwaj Karri, Morgan Hill, CA (US); Anand C. Monteiro, San Jose, CA (US); Debarshi Kar, Sunnyvale, CA (US); Sree Ram Kodali, San Jose, CA (US); Pradeep S. Sharma, Cupertino, CA (US); Yathish Hanumapuradoddi Shivanna, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/322,151

(22) Filed: May 23, 2023

(65) Prior Publication Data
US 2023/0300580 A1 Sep. 21, 2023

Related U.S. Application Data

(62) Division of application No. 16/949,153, filed on Oct. 15, 2020, now Pat. No. 11,696,100.
(Continued)

(51) Int. Cl.
*H04W 4/40* (2018.01)
*H04W 4/44* (2018.01)
(Continued)

(52) U.S. Cl.
CPC ............. *H04W 4/44* (2018.02); *H04W 4/40* (2018.02); *H04W 4/48* (2018.02); *H04W 4/60* (2018.02);
(Continued)

(58) Field of Classification Search
CPC .......... H04L 67/12–125; H04L 69/26; H04W 4/24–80; H04W 8/005;
(Continued)

(56) References Cited

U.S. PATENT DOCUMENTS

| 2014/0128063 A1 | 5/2014 | Chhabra |
| 2016/0234749 A1 | 8/2016 | Singh et al. |

(Continued)

FOREIGN PATENT DOCUMENTS

| CN | 104158580 | 11/2014 |
| CN | 104770055 | 7/2015 |

(Continued)

*Primary Examiner* — Timothy J Weidner
(74) *Attorney, Agent, or Firm* — Fay Kaplun & Marcin, LLP

(57) ABSTRACT

A connected car and an onboard user equipment (UE) may establish independent cellular connections and may also establish a connection between each other. The UE establishes a first cellular link between the UE and a first network, establishes a connection with a connected car, wherein the connected car has a second cellular link between the connected car and a second network, evaluates one or more conditions and declares one of the first cellular link or the connection with the connected car a primary network interface for the UE based on, at least, the one or more conditions.

17 Claims, 6 Drawing Sheets

Related U.S. Application Data

(60) Provisional application No. 62/923,076, filed on Oct. 18, 2019.

(51) Int. Cl.

| | | |
|---|---|---|
| *H04W 4/48* | (2018.01) |
| *H04W 4/60* | (2018.01) |
| *H04W 8/18* | (2009.01) |
| *H04W 8/20* | (2009.01) |
| *H04W 24/08* | (2009.01) |
| *H04W 24/10* | (2009.01) |
| *H04W 36/00* | (2009.01) |
| *H04W 36/14* | (2009.01) |
| *H04W 76/10* | (2018.01) |
| *H04W 76/15* | (2018.01) |
| *H04W 84/00* | (2009.01) |
| *H04W 84/02* | (2009.01) |
| *H04W 88/06* | (2009.01) |
| *H04W 88/10* | (2009.01) |
| *H04W 92/02* | (2009.01) |
| *H04W 92/10* | (2009.01) |
| *H04W 92/20* | (2009.01) |

(52) U.S. Cl.
CPC ............ *H04W 8/183* (2013.01); *H04W 8/20* (2013.01); *H04W 24/08* (2013.01); *H04W 24/10* (2013.01); *H04W 36/03* (2018.08); *H04W 36/14* (2013.01); *H04W 76/10* (2018.02); *H04W 76/15* (2018.02); *H04W 84/005* (2013.01); *H04W 84/02* (2013.01); *H04W 88/06* (2013.01); *H04W 88/10* (2013.01); *H04W 92/02* (2013.01); *H04W 92/10* (2013.01); *H04W 92/20* (2013.01)

(58) Field of Classification Search
CPC ..... H04W 8/18–245; H04W 24/02–10; H04W 28/02–26; H04W 36/0005–385; H04W 48/02–20; H04W 60/005–06; H04W 72/02–569; H04W 76/10–50; H04W 84/005–22; H04W 88/005–188; H04W 92/02–20; Y02D 30/70
See application file for complete search history.

(56) References Cited

U.S. PATENT DOCUMENTS

| | | | |
|---|---|---|---|
| 2016/0262094 A1 | 9/2016 | Khay-Ibbat et al. | |
| 2017/0238346 A1 | 8/2017 | Egner et al. | |
| 2017/0244837 A1* | 8/2017 | Kim | H04W 4/50 |
| 2018/0352530 A1* | 12/2018 | Singh | H04W 48/16 |
| 2020/0367048 A1* | 11/2020 | Nori | H04W 8/205 |

FOREIGN PATENT DOCUMENTS

| | | |
|---|---|---|
| CN | 107040877 | 8/2017 |
| CN | 107211330 | 9/2017 |
| CN | 107409158 | 11/2017 |

\* cited by examiner

ENHANCED NETWORK CONNECTIVITY FOR A CONNECTED CAR AND ONBOARD USER EQUIPMENT

PRIORITY CLAIM/INCORPORATION BY REFERENCE

This application claim priority to U.S. Provisional Application Ser. No. 62/923,076, entitled "Enhanced Network Connectivity for a Connected Car and Onboard User Equipment," filed Oct. 18, 2019, the entirety of which is incorporated by reference herein.

BACKGROUND

A connected car may be configured to establish a connection with a network. A driver or a passenger of the connected car may be equipped with a user equipment (UE). The UE may also be configured to establish a connection with a network. Thus, the connected car and the UE may each establish an independent network connection.

The UE may establish a further connection with the connected car. When paired, the connected car may utilize resources of the UE and vice versa. Under conventional circumstances, even when the connected car's network connection is of lesser quality than the UE's network connection, the connected car's network connection is used for network access on behalf of both the connected car and the UE. Accordingly, there is a need to improve how one of the independent network connections is selected to provide network access to both the connected car and the UE.

The performance associated with a device's network connection depends on a variety of different factors including, but not limited to, the device's hardware and the type of service that is to be provided to the device by the network. Generally, the hardware of the connected car is capable of out-performing the hardware of the UE. However, the type of service provided to the UE by the network may be superior to the type of service provided to the connected car by the network. Thus, when the UE and the connected car are paired, there may be scenarios where the connected car's hardware is available but not utilized. Similarly, there may be scenarios where the UE's network service is available but not utilized. Accordingly, there is a need for a mechanism that is able to use resources from both the connected car and the UE for network connectivity.

SUMMARY

Some exemplary embodiments are related to a processor of a user equipment (UE) configured to perform operations. The operations include establishing a first cellular link between the UE and a first network, establishing a connection with a connected car, wherein the connected car has a second cellular link between the connected car and a second network, evaluating one or more conditions and declaring one of the first cellular link or the connection with the connected car a primary network interface for the UE based on, at least, the one or more conditions.

Other exemplary embodiments are related to a processor of a connected car configured to perform operations. The operations include establishing a connection with a user equipment (UE), receiving an embedded subscriber identification module (eSIM) profile corresponding to the UE, establishing a network connection using the eSIM profile corresponding to the UE, receiving data from the network over the network connection and forwarding the data received from the network to the UE via the connection with the UE.

Still further exemplary embodiments are related to a processor of a connected car configured to perform operations. The operations include establishing a first connection with a first user equipment (UE), establishing a network connection, receiving a first set of data from a network over the network connection, forwarding the first set of data received from the network to the first UE via the first connection with the first UE, collecting data usage information for the first UE, wherein the data usage information for the first UE is based on, at least, the first set of data and reporting the data usage information for the first UE to a network component.

Additional exemplary embodiments are related to a user equipment (UE) having a transceiver configured to communicate with a connected car and with a network and a processor communicatively coupled to the transceiver and configured to perform operations. The operations include establishing a first cellular link between the UE and a first network, establishing a connection with the connected car, wherein the connected car has a second cellular link between the connected car and a second network, evaluating one or more conditions and declaring one of the first cellular link or the connection with the connected car a primary network interface for the UE based on, at least, the one or more conditions, wherein the primary network interface is used to access network services for both the UE and the connected car and wherein the first network and the second network are a same or different network.

DETAILED DESCRIPTION

Figure 1:
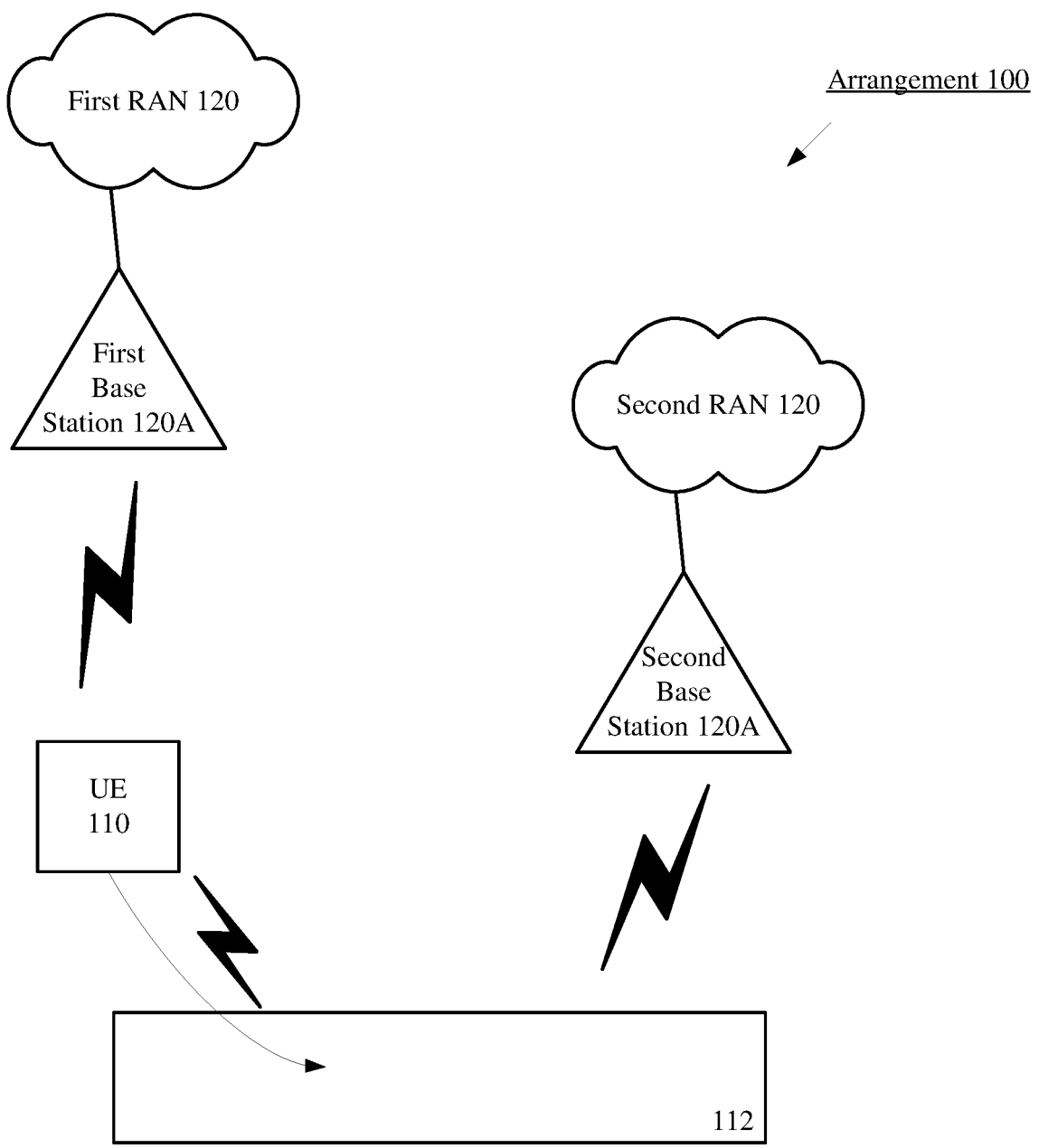
FIG. 1 shows an example arrangement according to the exemplary embodiments.

The exemplary embodiments may be further understood with reference to the following description and the related appended drawings, wherein like elements are provided with the same reference numerals. The exemplary embodiments describe devices, systems and methods to improve network connectivity for a connected car and/or an onboard user equipment (UE).

Throughout this description the term "connected car" may refer to a car that is equipped with hardware, software and/or firmware configured to establish one or more network connections. However, reference to a connected car is merely provided for illustrative purposes, different entities may refer to a similar concept by a different name. Further, reference to the connected car is not intended to limit the exemplary embodiments to cars. The exemplary embodiments may apply to any type of vehicle (with or without a motor) that is configured to navigate within any type of environment and equipped with hardware, software and/or firmware configured to establish one or more network connections.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The UE may establish a connection with the connected car. When paired, the connected car may utilize resources of the UE and vice versa. The exemplary embodiments relate to managing the resources of the UE and the connected car. In a first aspect, the exemplary embodiments relate to selecting the UE's network connection or the connected car's network connection to provide network access on behalf of both the UE and the connected car. In a second aspect, the exemplary embodiments relate to using one or more resources of the UE and one or more resources of the connected car for network connectivity.

FIG. 1 shows an example arrangement 100 according to the exemplary embodiments. The arrangement 100 includes a UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. In fact, the exemplary scenarios will be described below that include multiple users being in the connected car 112 and each user having their own UE. In the illustration of FIG. 1, the UE 110 is shown above the connected car 112. However, this is just for illustrative purposes. The UE 110 will typically be in the connected car 112 with the user.

The arrangement 100 also includes a connected car 112. The connected car 112 may represent any type of vehicle (with or without a motor) that is configured to navigate within any type of environment and equipped with hardware, software and/or firmware configured to establish one or more network connections.

The UE 110 may communicate directly with one or more networks. In the example of the arrangement 100, the UE 110 is shown as being connected to a first radio access network (RAN) 120 via a first base station 120A. The connected car 112 may also communicate directly with one or more networks. In the example of the arrangement 100, the UE 110 is shown as being connected to a second RAN 122 via a second base station 122A. The UE 110 network connection and the connected car 112 network connection may each be independent from one another and exist simultaneously. Reference to the first RAN 120, the first base station 120A, the second RAN 122 and the second base station 122A are only intended to demonstrate that the UE 110 and the connected car 112 are each capable of establishing independent network connections. In another example, the UE 110 and the connected car 112 may each establish independent connections to the first RAN 120 via the first base station 120A.

The RANs 120, 122 may be a portion of a cellular network that may be deployed by cellular providers (e.g., Verizon, AT&T, T-Mobile, etc.). For example, the RANs 120, 122 may be a 5G new radio (NR) RAN, a LTE RAN or a legacy RAN. The RANs 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from devices (e.g., the UE 110 and the connected car 112) that are equipped with the appropriate cellular chip set.

Those skilled in the art will understand that any association procedure may be performed for the UE 110 to connect to the RAN 120 and for the connected car 112 to connect to the RAN 122. For example, as discussed above, the RANs 120, 122 may be associated with a particular cellular service provider. The UE 110 and/or the user thereof has a contract and credential information (e.g., stored on a SIM). Upon detecting the presence of the RAN 120, the UE 110 may transmit the corresponding credential information to associate with the RAN 120. More specifically, the UE 110 may associate with a specific base station (e.g., the base station 120A of the RAN 120). Similarly, the connected car 112 may also be associated with a contract and credential information (e.g., stored on a SIM). Upon detecting the presence of the RAN 122, the connected car 112 may transmit the corresponding credential information to associate with the RAN 122. More specifically, the connected car 112 may associate with a specific base station (e.g., the base station 122A of the RAN 122).

The UE 110 may establish a connection with the connected car 112. In this example, the UE 110 is onboard the connected car 112. However, the exemplary embodiments are not limited to a scenario in which the UE 110 is located within the connected car 112. The exemplary embodiments may also apply to a scenario in which the UE 110 is connected to the connected car 112 while located outside of the connected car 112.

In some embodiments, the connection between the UE 110 and the connected car 112 is a wired connection (e.g., via a USB connection, Lightning connector, etc.). In other embodiments, the connection between the UE 110 and the connected car 112 is a wireless connection, e.g., WiFi, WiFi peer-to-peer, Bluetooth or any other appropriate short-range communication protocol. Thus, if the UE 110 and the connected car 112 are within a proximity of one another (e.g., within a distance in which WiFi or Bluetooth communications may be performed), the UE 110 and the connected car 112 may exchange data. Throughout this description, any reference to any particular type of connection between the UE 110 and the connected car 112 is only provided for illustrative purposes. The exemplary embodiments may apply to any appropriate type of connection between the UE 110 and the connected car 112.

When the UE 110 and the connected car 112 are paired (using either a wired or wireless connection), the UE 110 and the connected car 112 may have a companion relationship. In some embodiments, the UE 110 is a source device and the connected 112 is an accessory device. In other embodiments, the connected car 112 is the source device and the UE 110 is the accessory device. The accessory device may be configured to access network services by utilizing only the wired connection or the short-range communication protocol without connecting to any of the RANs 120, 122. For example, the UE 110 may connect to the RAN 120 and relay data exchanged with the RAN 120 to the connected car 112 over the wired connection or the short-range communication pathway. In another example, the connected car 112 may connect to the RAN 122 and relay data exchanged with the RAN 122 to the UE 110 over the wired connection or the short-range communication pathway. In a further example, one or more resources of the UE 110 (e.g., hardware, software, firmware, SIM, etc.) may be used with one or more resources of the connected car 112 (e.g., hardware, software, firmware, SIM, etc.) for network connectivity. As mentioned above, both the UE 110 and the connected car 112 may each establish an independent network connection that exists simultaneously, thus, the UE 110 and the connected car 112 may connect to the RANs 120, 122 regardless of whether a companion relationship exists.

To provide a general example of the context in which a user may utilize the arrangement 100, consider the following exemplary scenario. The user is driving the connected car 112 to a destination and the UE 110 is onboard. The UE 110 has established a WiFi connection with the connected car 112. The UE 110 has also established an independent connection to the RAN 120 via the base station 120A and the connected car 112 has established an independent network connection with the RAN 122 via the base station 122A.

As will be described in more detail below with regard to FIG. 2, the connected car 112 may include one or more display devices located at various locations throughout the car. For example, the dashboard of the connected car 112 may include a touchscreen. The connected car 112 may be configured to provide a variety of different user interfaces on the touchscreen. Each user interface may include one or more interactive features.

The UE 110 and the connected car 112 may exchange information and data over the WiFi connection to perform various tasks for the user. For instance, the connected car 112 may be configured to display a user interface associated with the UE 110. This user interface may allow the user to access data stored on the UE 110 and/or network services normally available to the UE 110. Thus, the user may interact with the touchscreen display of the connected car 112 to access data and/or services of the UE 110.

To provide a first general example, the UE 110 may have music stored locally. When paired with the connected car 112, an indication of the music stored locally on the UE 110 may be displayed on the touchscreen of the connected car 112. User input received at the touchscreen of the connected car 112 may trigger the music stored locally at the UE 110 to be output via audio output devices included in the connected car 112.

To provide a second general example, the UE 110 may have a navigation application stored locally. When the UE 110 is paired with the connected car 112, an icon for the navigation application stored locally at the UE 110 may be displayed on the touchscreen of the connected car 112. User input received at the touchscreen of the connected car 112 may trigger the navigation application to launch. When launched, the navigation application stored locally at the UE 110 may communicate with the network using the network connection of the connected car 112. These turn-by-turn navigation features are then output by the touchscreen of the connected car 112 and/or audio output devices included in the connected car 112.

As mentioned above, in a first aspect, the exemplary embodiments relate to selecting one of the UE 110 network connection or the connected car 112 network connection to provide network access on behalf of both the UE and the connected car 112. For instance, in the example provided above, the connected car 112 network connection is used for the navigation application. The exemplary embodiments provide various mechanisms for determining which network connection, the UE 110 network connection or the connected car 112 network connection, is be utilized when the UE 110 and the connected car 112 are paired. In a second aspect, the exemplary embodiments relate to using one or more resources of the UE 110 (e.g., hardware, software, firmware, SIM, etc.) and one or more resources of the connected car 112 (e.g., hardware, software, firmware, SIM, etc.) for network connectivity. The above-mentioned scenarios and examples are only provided for illustrative purposes and are not intended to limit the exemplary embodiments in any way. The above-mentioned scenarios and examples are only intended to provide a general example of the context in which a user may utilize the arrangement 100.

Figure 2:
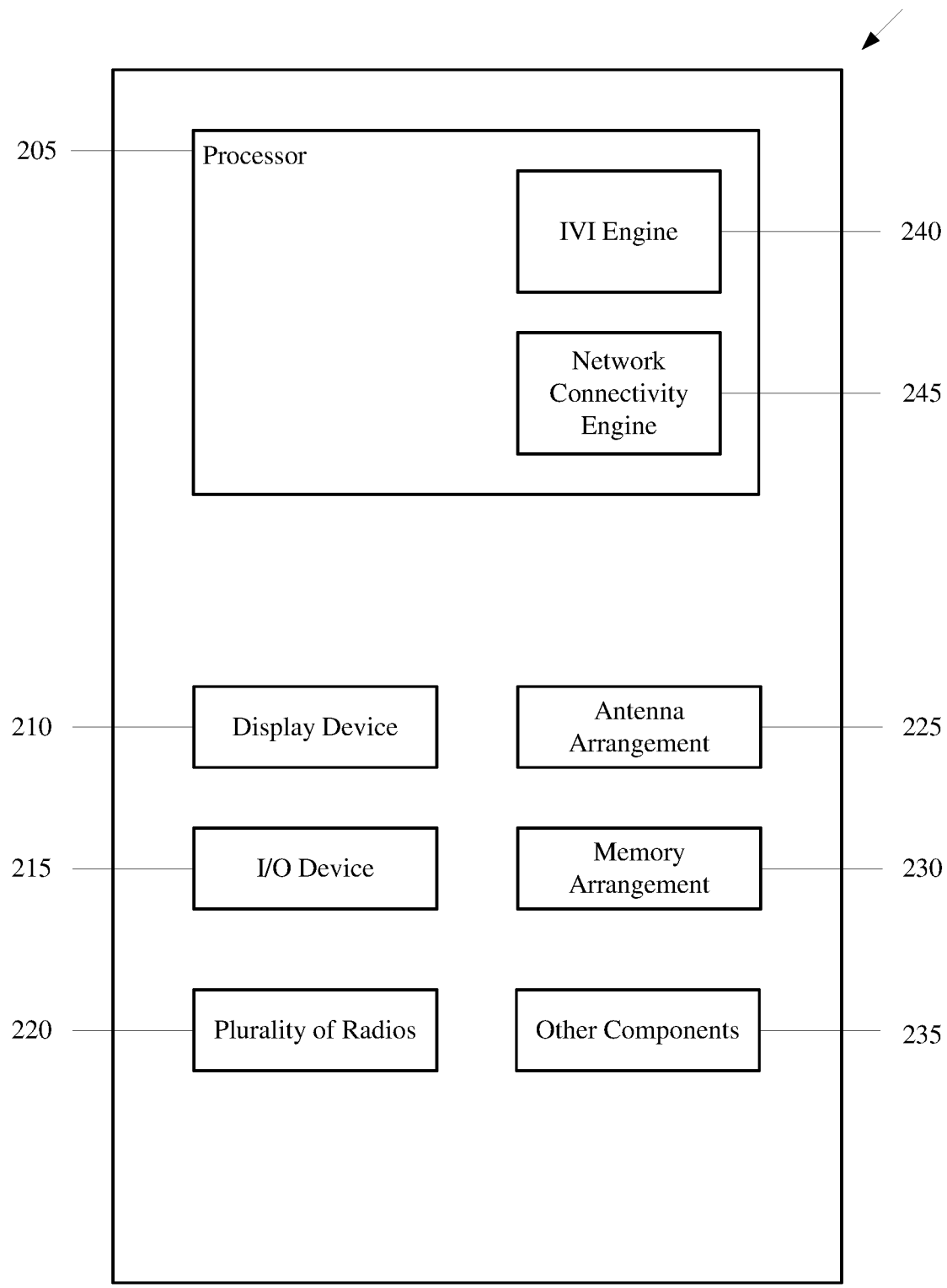
FIG. 2 shows an exemplary set of connected car components according to various exemplary embodiments.

FIG. 2 shows an exemplary set of connected car components 200 according to various exemplary embodiments. The set of connected car components 200 will be described with regard to the arrangement 100. As mentioned above, the connected car 112 may represent any type of vehicle (with or without a motor) that is configured to navigate within any type of environment and equipped with hardware, software and/or firmware configured to establish one or more network connections. Thus, the connected car 112 may include a wide variety of different components configured to perform a wide variety of different tasks. The set of connected car components 200 relate to how the connected car 112 i) communicates with the network, ii) communicates with the UE 110 and iii) interacts with the user.

The set of connected car components 200 may include a processor 205, a display device 210, an input/output (I/O) device 215, a plurality of radios 220, an antenna arrangement 225, a memory arrangement 230 and other components 235.

The display device 210 may be a hardware component configured to show data to the user. The connected car 112 may include one or more display devices 210. For example, the dashboard of the connected car 112 may include a display device 210. In another example, a display device 210 may be integrated into one or more headrests. The I/O device 215 may be a hardware component that enables the user to enter inputs. The connected car 112 may include one or more I/O devices 215. For example, the display device 210 and the I/O device 215 may be integrated together such as a touchscreen. In another example, the I/O device 215 may be represented as one or more buttons included the dashboard and/or steering wheel.

The plurality of radios 220 may be hardware components configured to establish a connection with the RAN 122 (e.g., a 5G NR RAN, an LTE RAN, a legacy RAN, etc.) and a connection to the UE 110 using a short-range communication protocol (e.g., WiFi, Bluetooth, etc.). Accordingly, the plurality of radios 220 may operate on a variety of different frequencies or channels (e.g., set of consecutive frequencies). For example, the connected car 112 may establish a connection with the UE 110 over the 2.4 GHz band and/or the 5 GHz band. The antenna arrangement 225 may include one or more antennas configured to send and receive wireless traffic for the plurality of radios 220.

The processor 205 may be configured to execute a plurality of engines for the connected car 112. For example, the engines may include an in-vehicle infotainment (IVI) engine 240 and a network connectivity engine 245. The IVI engine 240 may manage how and when multimedia data (e.g., audio, video, text, graphics, etc.) is presented to the user via one or more components from the set of connected car components 200. The network connectivity engine 245 may collect data associated with the connected car 112 network connection and/or the UE 110 network connection.

The above referenced engines each being an application (e.g., a program) executed by the processor 205 is only exemplary. The functionality associated with the engines may also be represented as a separate incorporated component of the connected car 112 or may be a modular component coupled to the connected car 112, e.g., an integrated circuit with or without firmware. For example, the integrated circuit may include input circuitry to receive signals and processing circuitry to process the signals and other information. The engines may also be embodied as one application or separate applications. In addition, in some connected cars, the functionality described for the processor 205 is split among two or more processors such as a baseband processor and an application processor. The exemplary embodiments may be implemented in any of these or other configurations of a connected car.

The memory arrangement 230 may be a hardware component configured to store data related to operations performed by the connected car 112. The other components 235 may include, for example, a SIM, an audio input device, an audio output device, ports to electronically connect to other devices (e.g., the UE 110), sensors to detect conditions of the connected car 112, etc.

The other components 140 may also include an eCommerce module that includes a sensor and a communication interface. The sensor may be configured to detect eCommerce entities. The communication interface may facilitate communications between the connected car 112, the UE 110, eCommerce entity and the cellular data plan provider such that the user may use the cellular data plan for payment. For example, the eCommerce module may be configured to detect toll booths and allow users to use their cellular data plan for toll payment.

Figure 3:
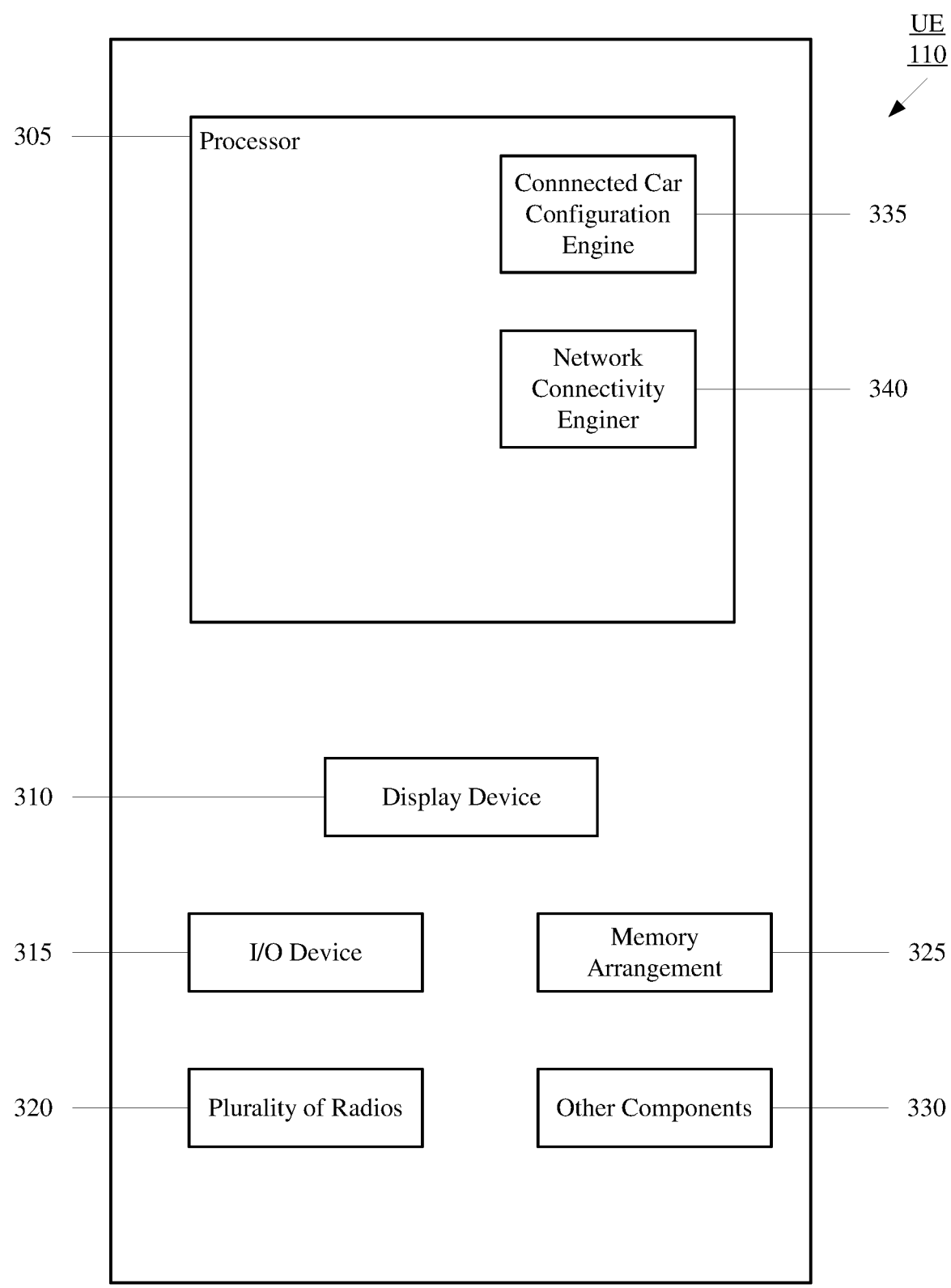
FIG. 3 shows an exemplary UE according to various exemplary embodiments.

FIG. 3 shows an exemplary UE 110 according to various exemplary embodiments. The UE 110 will be described with regard to the network arrangement 100 of FIG. 1. The UE 110 may represent any electronic device and may include a processor 305, a display device 310, an input/output (I/O) device 315, a plurality of radios 320, a memory arrangement 325 and other components 330. The other components 330 may include, for example, a SIM, an audio input device, an audio output device, a battery that provides a limited power supply, one or more antennas, a data acquisition device, ports to electrically connect the UE 110 to other electronic devices (e.g., the connected car 112), sensors to detect conditions of the UE 110, etc.

The processor 305 may be configured to execute a plurality of engines for the UE 110. For example, the engines may include a connected car configuration engine 335 and a network connectivity engine 340. The connected car configuration engine 335 may manage the relationship between the UE 110 and the connected car 112. For example, the connected car configuration engine 335 may provide data that is used by the connected car 112 to generate a user interface that allows the user to access data stored on the UE 110 and/or network services normally available to the UE 110 when interacting with the connected car 112. The network connectivity engine 345 may collect data associated with the connected car 112 network connection and/or the UE 110 network connection.

The above referenced engine being executed by the processor 305 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an application processor. The exemplary embodiments may be implemented in any of these or other configurations of a UE.

The plurality of radios 320 may be hardware components configured to establish a connection with the RAN 120 (e.g., a 5G NR RAN, an LTE RAN, a legacy RAN, etc.) and a connection to the connected car 112 using a short-range communication protocol (e.g., WiFi, Bluetooth, etc.). Accordingly, the plurality of radios 320 may operate on a variety of different frequencies or channels (e.g., set of consecutive frequencies). For example, the UE 110 may establish a connection with the connected car 112 over the 2.4 GHz band and/or the 5 GHz band.

The memory arrangement 325 may be a hardware component configured to store data related to operations performed by the UE 110. The display device 310 may be a hardware component configured to show data to a user while the I/O device 315 may be a hardware component that enables the user to enter inputs. The display device 310 and the I/O device 315 may be separate components or integrated together such as a touchscreen.

Figure 4:
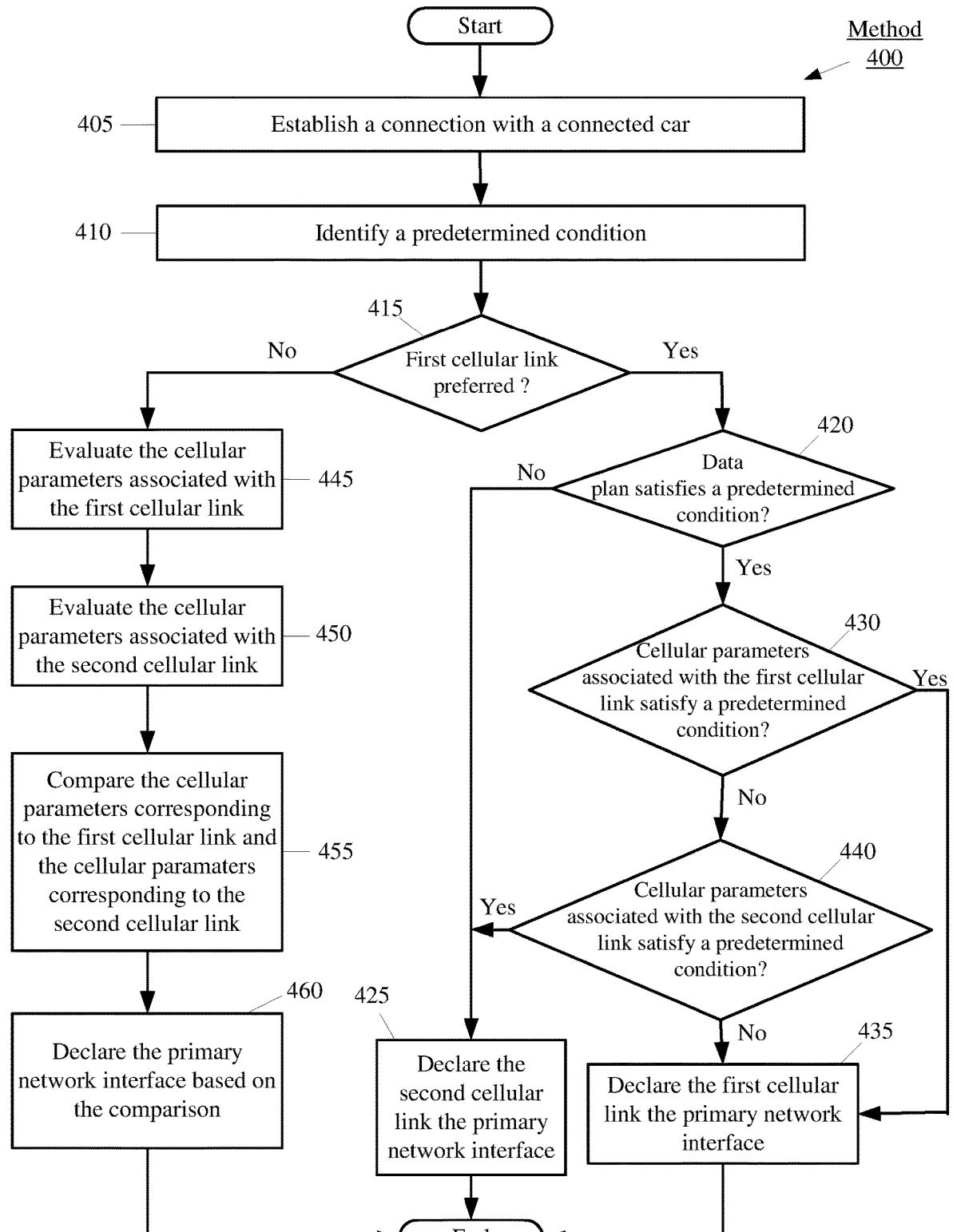
FIG. 4 shows a method for selecting a cellular link that is to be used for network connectivity according to various exemplary embodiments.

FIG. 4 shows a method 400 for selecting a cellular link that is to be used for network connectivity according to various exemplary embodiments. The method 400 will be described with regard to the UE 110 of FIG. 3, the connected car 112 of FIG. 2 and the arrangement 100 of FIG. 1.

Consider the following exemplary scenario in which the user is driving the connected car 112 to a destination and the UE 110 is onboard. The UE 110 has established a network connection with the RAN 120 via the base station 120A to form a first cellular link. The connected car 112 has also established a network connection with the RAN 122 via the base station 122A to form a second cellular link. The first cellular link and the second cellular link may be separately established and may exist simultaneously. The method 400 will be described with regard to the UE 110 selecting between the first cellular link and the second cellular link for network connectivity. However, the exemplary embodiments are not limited to the UE 110 making this selection and may also apply to the connected car 112 making this selection.

In 405, the UE 110 establishes a connection to the connected car 112. In this example, the connection between the UE 110 and the connected car 112 is a WiFi connection. In other embodiments the connection may be a wired connection or a wireless connection in accordance with any appropriate short-range communication protocol.

As mentioned above, when paired, the user may interact with the connected car 112 to access data stored on the UE 110 and/or network services normally available to the UE 110. In this configuration, either the first cellular link (e.g., the connection between UE 110 and base station 120A) or the second cellular link (e.g., the connection between the connected car 112 and the base station 122A) may be used for network connectivity. To use the first cellular link, the UE 110 communicates directly with the RAN 120. To use the second cellular link, the UE 110 may communicate with the connected car 112 via the WiFi connection and the connected car 112 may communicate with the RAN 122 on behalf of the UE 110.

As will be shown below, when the first cellular link is to be used, the UE 110 declares the first cellular link as the primary network interface and the WiFi connection as the secondary network interface. When the second cellular link is to be used, the UE 110 declares the first cellular link as the secondary network interface and the WiFi connection as the primary network interface. During operation, the UE 110 will use the primary network interface to communicate with the network. In some embodiments, if a connection issue occurs that prevents the UE 110 from communicating with the network via the primary network interface, the UE 110 may use the secondary network interface to communicate with the network.

In 410, the UE 110 identifies a predetermined condition. This predetermined condition may indicate to the UE 110 that the UE 110 is to declare a primary network interface. The predetermined condition may be based on any of a plurality of different factors, including but not limited to, a timer, a schedule, initially establishing a connection between the UE 110 and the connected car 112, launching an application, user input, a change in UE 110 and/or connected car 112 geographic location, a handover, a tracking area update (TAU), information received from the network, information stored on the UE 110 or the connected car 112 regarding previous network interactions under similar circumstances, a combination thereof, etc. However, any reference to a particular factor triggering the UE 110 to declare a primary network interface is only provided for illustrative purposes. The exemplary embodiments may be triggered to declare a primary network interface based on any appropriate factor being identified at any instance.

In 415, the UE 110 determines whether the first cellular link is preferred. Typically, the network services provided by the carrier for the UE 110 are superior to the network services provided by the carrier for the connected car 112. Thus, the selection mechanism may be configured with a preference towards the first cellular link (e.g., the network connection between the UE 110 and the RAN 120). In some embodiments, this preference may be explicitly set by the user, the network, one or more carriers or any combination thereof. In other embodiments, this preference may be implicitly indicated based on previous interactions with the network under similar circumstances, previous instances of using a particular feature or application under similar circumstances, information stored or collected by the UE 110, information stored or collected by the connected car 112, information received from the network, etc. If the first cellular link is preferred, the method 400 continues to 420.

In 420, the UE 110 determines whether a data plan between an account associated with the UE 110 and a carrier satisfies a predetermined condition. A carrier may charge the account associated with the UE 110 based on the amount of data used by the UE 110 in the downlink and/or uplink direction. The predetermined condition may indicate to the UE 110 that using the first cellular link for network connectivity may cause the account associated with the UE 110 to be charged an unreasonable fee. The predetermined condition may be satisfied when the account associated with the UE 110 has an unlimited data plan or has an amount of unused available data that exceeds a predetermined threshold. In some embodiments, this predetermined condition may also be satisfied by explicit user input. When the predetermined condition is not satisfied the method 400 continues to 425.

In 425, since the account associated with the UE 110 is in danger of being charged an unreasonable fee for data services, the UE 110 declares the WiFi connection as the primary network interface. Subsequently, the UE 110 utilizes the second cellular link to exchange data with the network.

Returning to 420, when the predetermined condition is satisfied the method 400 continues to 430. In 430, the UE 110 determines whether cellular parameters associated with the first cellular link satisfy a predetermined condition. This predetermined condition may indicate to the UE 110 that the first cellular link is of sufficient quality and/or capable of sufficient performance and thus, may be declared the primary network interface. How the first cellular link is to be evaluated is described in detail below with regard to 445. When the predetermined condition is satisfied, the method 400 continues to 435.

In 440, the UE 110 declares the first cellular link the primary network interface. Since the UE 110 is configured to have a preference towards the first cellular link and the account associated with the UE 110 is not in danger of being subject to an unreasonable fee, the first cellular link may be declared the primary network interface regardless of the state of the second cellular link.

Returning to 430, when the predetermined condition is not satisfied, the method 400 continues to 440. In 440, the UE 110 determines whether cellular parameters associated with the second cellular link satisfy a predetermined condition. This predetermined condition may indicate to the UE 110 that the second cellular link is of sufficient quality and/or capable of sufficient performance and thus, the WiFi connection may be declared the primary network interface. How the second cellular link is to be evaluated is described in more detail below with regard to 450.

If the predetermined condition is not satisfied, the method 400 continues to 435. As mentioned above, in 435, the UE 110 declares the first cellular link the primary network interface. Since the UE 110 is configured to have a preference towards the first cellular link, the account associated with the UE 110 is not in danger of being subject to an unreasonable fee and the second cellular link is not of sufficient quality and/or capable of sufficient performance the UE 110 may declare the first cellular link the primary network interface despite the radio conditions associated with the first cellular link failing to satisfy the predetermined condition in 430. Subsequently, the UE 110 utilizes the first cellular link to exchange data with the network.

Returning to 435, if the predetermined condition is satisfied, the method 400 continues to 425. As mentioned above, in 425, the UE 110 declares the WiFi connection the primary network interface. Although the UE 110 has a preference towards the first cellular link and the user account associated with the UE 110 is not in danger of being charged an unreasonable fee, the UE 110 declares the WiFi connection the primary link based on the radio conditions associated with the second cellular link satisfying the predetermined threshold in 440. Subsequently, the UE 110 utilizes the second cellular link to exchange data with the network.

Returning to 415, if there is no preference, the method 400 continues to 445. In 445, the UE 110 evaluates the cellular parameters corresponding to the first cellular link. The parameters corresponding to the first cellular link may be based on any of a variety of different factors. For example, one factor may relate to the type of base station/RAN (e.g., 5G NR, LTE, legacy, etc.) the UE 110 is currently camped on. Another factor may relate to radio conditions associated with the currently camped base station. The radio conditions may include, but are not limited to, reference signal received power (RSRP), channel quality indicator (CQI), reference signal received quality (RSRQ), signal-to-noise-plus-interference ratio (SINR), received signal strength indicator (RSSI), energy to interference ratio (ECIO), received signal code power (RSCP), etc. A person of ordinary skill in the art would understand how the measurement data associated with these radio conditions may be collected. Another factor may relate to the radio load as reported by the base station or estimated by the UE 110. Further, the uplink data rate may be considered. The uplink data rate may be determined based on parameters such as, but not limited to, power headroom and characteristics associated with scheduling requests between the UE 110 and the currently camped base station. Other factors may include, estimated available bandwidth, type of data plan and available unused data. However, reference to any particular cellular parameter is merely provided for illustrative purposes, the exemplary embodiments may apply to any appropriate factor.

In 450, the UE 110 evaluates the cellular parameters corresponding to the second cellular link. The parameters corresponding to the second cellular link may be based on any of a variety of different factors. For example, one factor may relate to the type base station/RAN (e.g., 5G NR, LTE, legacy, etc.) the connected car 112 is currently camped on. Another factor may relate to radio conditions associated with the currently camped base station. The radio conditions may include, but are not limited to, reference signal received power (RSRP), channel quality indicator (CQI), reference signal received quality (RSRQ), signal-to-noise-plus-interference ratio (SINR), received signal strength indicator (RSSI), energy to interference ratio (ECIO), received signal code power (RSCP), etc. A person of ordinary skill in the art would understand how the measurement data associated with these radio conditions may be collected. However, reference to any particular cellular parameter is merely provided for illustrative purposes, the exemplary embodiments may apply to any appropriate factor. It should also be understood that the UE 110 may receive the cellular parameters corresponding to the second cellular link via the connection (e.g., short range connection) with the connected car 112, e.g., the hardware/software of the connected car 112 may perform the appropriate measurements for the second cellular link and provide this information to the UE 110 for the purposes of the comparison.

When evaluating the cellular parameters associated with the first cellular link in 445 and the cellular parameters associated with the second cellular link in 450, the UE 110 may consider the type of application (e.g., streaming multimedia data, navigation, video call, audio call, etc.) that is to be utilized. For instance, one of the first cellular link or the second cellular link may be capable of providing better performance for an audio call and the other cellular link may be capable of providing better performance for streaming multimedia data. Further, when evaluating the cellular parameters associated with the first cellular link in 445 and the cellular parameters associated with the second cellular link in 450, the UE 110 may also reference information received from the application layer and/or transport layer. This information may include indications of previously experience stalls or errors, end-to-end latency, estimated bandwidth, real-time protocol erasures, an indication of a broken link (e.g., the first cellular link or the second cellular link), push notification failures, transport control protocol (TCP) connection failure attempts, TCP round trip time (RTT), etc. However, reference to any particular type of information received from the application layer and/or the transport layer is merely provided for illustrative purposes, the exemplary embodiments may apply to any appropriate type of information associated with the application layer and/or the transport layer.

Returning to the method 400, in 455, the UE 110 compares the cellular parameters corresponding to the first cellular link and the cellular parameters corresponding to the second cellular link. In 460, the UE 110 declares one of the first cellular link or the WiFi connection as the primary network interface based on the comparison. The exemplary embodiments are not limited to any particular criteria for this comparison and UE 110 may decide between the first cellular link and the second cellular link using any appropriate basis.

The connected car 112 may travel from a first location to a second location. During the trip between these locations, the cellular environment relative to the connected car 112 and the UE 110 may change. For example, at the first location the connected car 112 and the UE 110 may be within the coverage area of a first base station and at the second location the connected car 112 and the UE 110 may be within the coverage area of a second base station. Similarly, at the first location the connected car 112 and the UE 110 may initially be at a location within coverage area that provides sufficient cellular quality/performance and at the second location the connected car 112 and the UE 110 may be at the edge of the same coverage area. Further, during the trip, the connected car 112 and the UE 110 may be used to perform a variety of different tasks (e.g., streaming music, performing a voice call, turn-by-turn navigation, etc.) To ensure that the primary network interface provides sufficient quality and/or performance for a particular task, the method 400 may be an ongoing process. Thus, as indicated in 410, the UE 110 may be triggered to declare a primary network interface based on any appropriate factor being identified at any instance.

The method 400 was described with regard to a single UE 110. However, the exemplary embodiments are not limited to a single UE 110 connecting to the connected car 112. When there are multiple UEs onboard, the method 400 may be performed for each of the onboard UEs. Thus, there may be scenarios in which more than one UE uses their respective direct cellular link as their primary network interface and more than one UE uses their respective connection to the connected car 112 as their primary network interface.

As indicated above, in certain scenarios, the hardware of the connected car 112 may be capable of out-performing the hardware of the UE 110. To provide an example, the connected car 112 antenna arrangement 225 may be superior to the antenna included in the UE 110. To provide another example, the connected car 112 may have a more powerful processor 205 than the processor 305 of the UE 110. However, the connected car 112 may be configured with a data plan that is not capable of providing the same quality of experience as the data plan for the UE 110. Thus, there may be scenarios in which the connected car 112 hardware is available but not utilized. There may also be scenarios in which the data plan of the UE 110 is available but not utilized. The exemplary embodiments described below relate to using one or more resources of one or more onboard UEs (e.g., hardware, software, firmware, SIM, etc.) with one or more resources of the connected car 112 (e.g., hardware, software, firmware, SIM, etc.) for network connectivity.

In a first example, using resources of the UE 110 and the connected car 112 may include using the hardware of the connected car 112 as a layer 1 (L1)/layer 2 (L2) repeater. For instance, the UE 110 may transmit information and/or data at a low power mode. This information and/or data may be received by the connected car 112 and forwarded to the network (at a higher power) on behalf of the UE 110.

Figure 5:
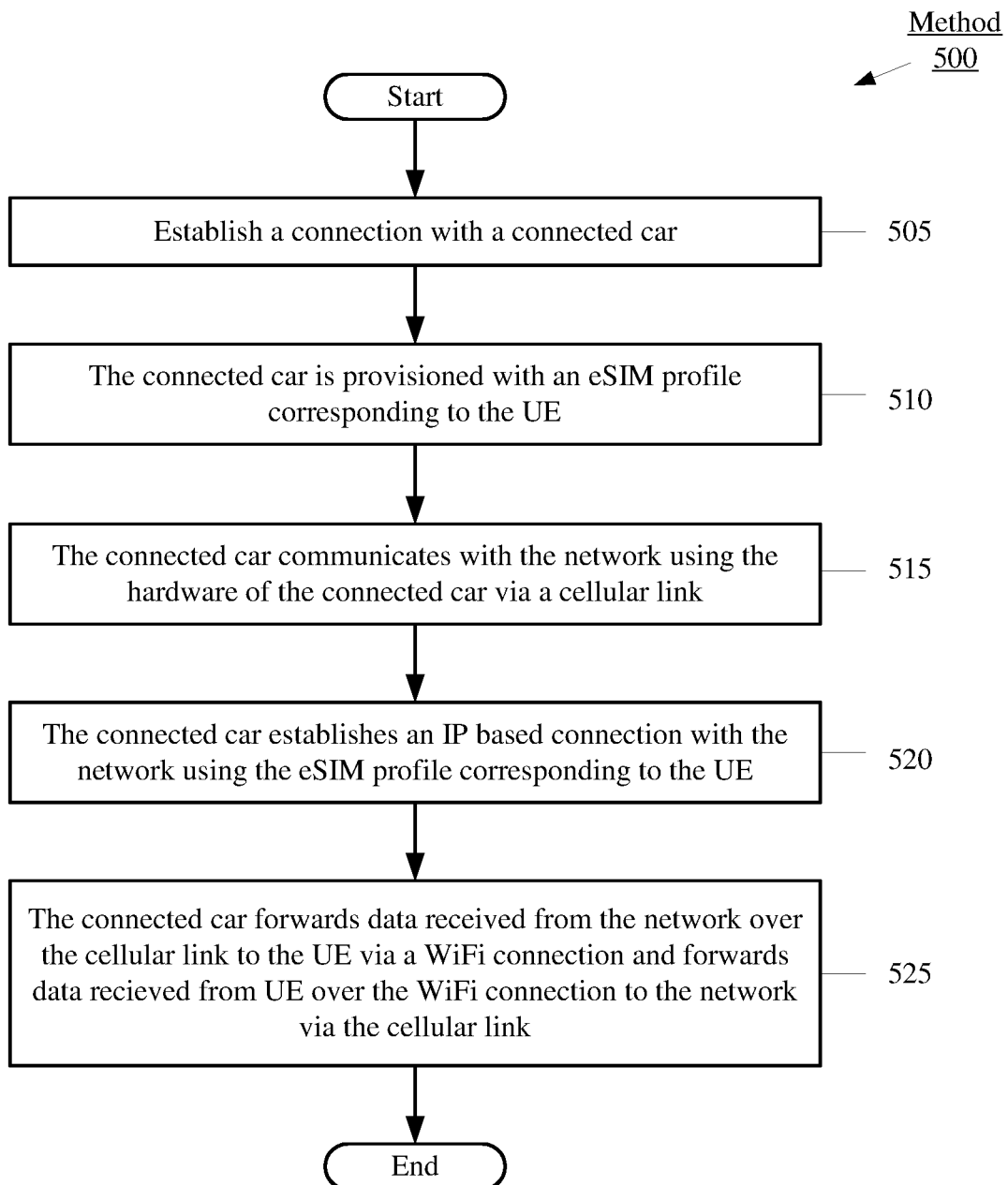
FIG. 5 shows a method for using one or more resources from the UE and one or more resources from the connected car for network connectivity according to various exemplary embodiments.

FIG. 5 shows a method 500 for using one or more resources from the UE 110 and one or more resources from the connected car 112 for network connectivity according to various exemplary embodiments. The method 500 will be described with regard to the UE 110 of FIG. 3, the connected car 112 of FIG. 2 and the arrangement 100 of FIG. 1.

As will be described in more detail below, the method 500 relates to using the hardware of the connected car 112 and the data plan of the UE 110 for network connectivity. This may include configuring the connected car 112 with an embedded SIM (eSIM) profile corresponding to the UE 110. From the network perspective, the eSIM profile may make it appear as if the UE 110 is communicating with the network. However, the connected car 112 is actually participating in a signaling exchange with the network.

A person of ordinary skill in the art would understand that a SIM contains information that is used by a device to establish a network connection. For example, the SIM may include an international mobile subscriber identifier (IMSI) that may be used for authentication with the network provider. However, reference to an IMSI is merely provided for illustrative purposes, a SIM may include a wide variety of different types of information that different networks or entities may refer to by different names. Accordingly, the exemplary embodiments may apply to a SIM that contains any type of information used by the device to establish a network connection.

The connected car 112 may include an eSIM. The eSIM is an embedded integrated circuit and is not intended to be physically removed. In contrast, a SIM is an integrated circuit that is capable of being physically inserted and removed from a device. The eSIM of the connected car 112 may be provisioned with an eSIM profile. In one embodiment, the eSIM profile may be a clone of the SIM of the UE 110. In another embodiment, the eSIM profile and the SIM of the UE 110 may be associated with the same telephone number and/or account on the network side. In this example, the SIM of the UE 110 may be a primary profile while the eSIM of the connected car 112 is a secondary profile. The SIM of the UE 110 may be associated with multiple different secondary profiles. The carrier may bill the usage of the primary profile and one or more secondary profiles to the same account. Thus, when provisioned with the eSIM profile corresponding to the UE 110, the UE 110 and the connected car 112 may be associated with the same telephone number and/or account. However, reference to the connected car 112 being equipped with an eSIM and the UE 110 being equipped with a SIM is merely provided for illustrative purposes. The UE 110 and the connected car 112 may each be equipped with an eSIM and/or a SIM.

In 505, the UE 110 establishes a connection to the connected car 112. In this example, the connection between the UE 110 and the connected car 112 is a WiFi connection. In other embodiments the connection may be a wired connection or a wireless connection in accordance with any appropriate short-range communication protocol.

In 510, the connected car 112 is provisioned with an eSIM profile corresponding to the UE 110. In some embodiments, the eSIM profile information is stored locally on the UE 110 and provided to the connected car 112 over the WiFi connection. In other embodiments, the eSIM profile may be retrieved (directly or indirectly) by either the UE 110 or the connected car 112 from a network server. A person of ordinary skill in the art would understand how the information of the eSIM profile is retrieved and provided to the connected car 112.

In 515, the connected car 112 communicates with the network using the hardware of the connected car 112 via a cellular link. For example, the connected car 112 may participate in a signaling exchange with one of the RANs 120, 122 using the antenna arrangement 225 and one of the plurality of radios 220.

In 520, the connected car 112 establishes an internet protocol (IP) based connection with the network using the eSIM profile corresponding to the UE 110. Thus, from the network perspective, the network is connected to the UE 110. However, it is actually the connected car 112 hardware that is maintaining a cellular link with a base station. Since the eSIM associated with the UE 110 is being utilized to connect to the network, the UE 110 may transition its cellular baseband processor into a low power mode. This ensures that cellular traffic is sent and received via the connected car 112 and not to the UE 110.

In 525, the connected car 112 forwards data received from the network over the cellular link to the UE 110 via the WiFi connection and forwards data received from the UE 110 over the WiFi connection to the network via the cellular link. Thus, in this example, the hardware resources of the connected car 112 and the SIM/network resources of the UE 110 are used for network connectivity.

In some embodiments, after the connection between the UE 110 and the connected car 112 is terminated, the eSIM profile associated with the UE 110 may remain stored within the memory arrangement 230 of the connected car 112. This may be convenient for the user if the user owns both the UE 110 and the connected car 112. However, to ensure that unauthorized use of the data plan associated with the UE 110 does not occur, the UE 110 may deactivate the eSIM profile associated with the UE 110 before terminating the connection to the connected car 112. The connected car 112 may also be configured to deactivate the eSIM profile associated with the UE 110 when the connected car 112 determines that the connection between the UE 110 and the connected car 112 no longer exists.

In some embodiments, instead of relying on the connected car 112 to perform all the baseband processing, the baseband processing may be split between the connected car 112 and the UE 110. Thus, the connected car 112 may perform baseband processing on a first portion of the protocol stack and the UE 110 may perform baseband processing on a second portion of the protocol stack. This split baseband approach is enabled by the high-speed/low latency connection between the UE 110 and the connected car 112.

As a security measure, during the split baseband approach, the UE 110 may implement the NAS module that performs authentication. In addition, the PDCP may be implemented by the UE 110 or the higher layer PDCP (e.g., ciphering, integrity protection) may be implemented by the UE 110 while the lower layer PDCP (e.g., re-ordering, robust header compression) may be performed by the connected car 112. However, any reference to any particular protocol stack operation being performed by either the UE 110 or the connected car 112 during the split baseband approach is merely provided for illustrative purposes. The exemplary embodiments may split the baseband processing between the connected car 112 and the UE 110 in any appropriate manner.

The UE 110 may be one of multiple onboard UEs. The connected car 112 may be configured with an eSIM profile associated with each of the onboard UEs. In some embodiments the connected car 112 maintains an independent relationship with each of the UEs. Thus, the data plan associated with a particular UE will account for all of the data used by that UE. In other embodiments, the network services associated with one of the UEs may be provided to the other onboard UEs via the connected car 112. Thus, the data plan associated with a particular UE may account for some of the data used by a different onboard UE.

Figure 6:
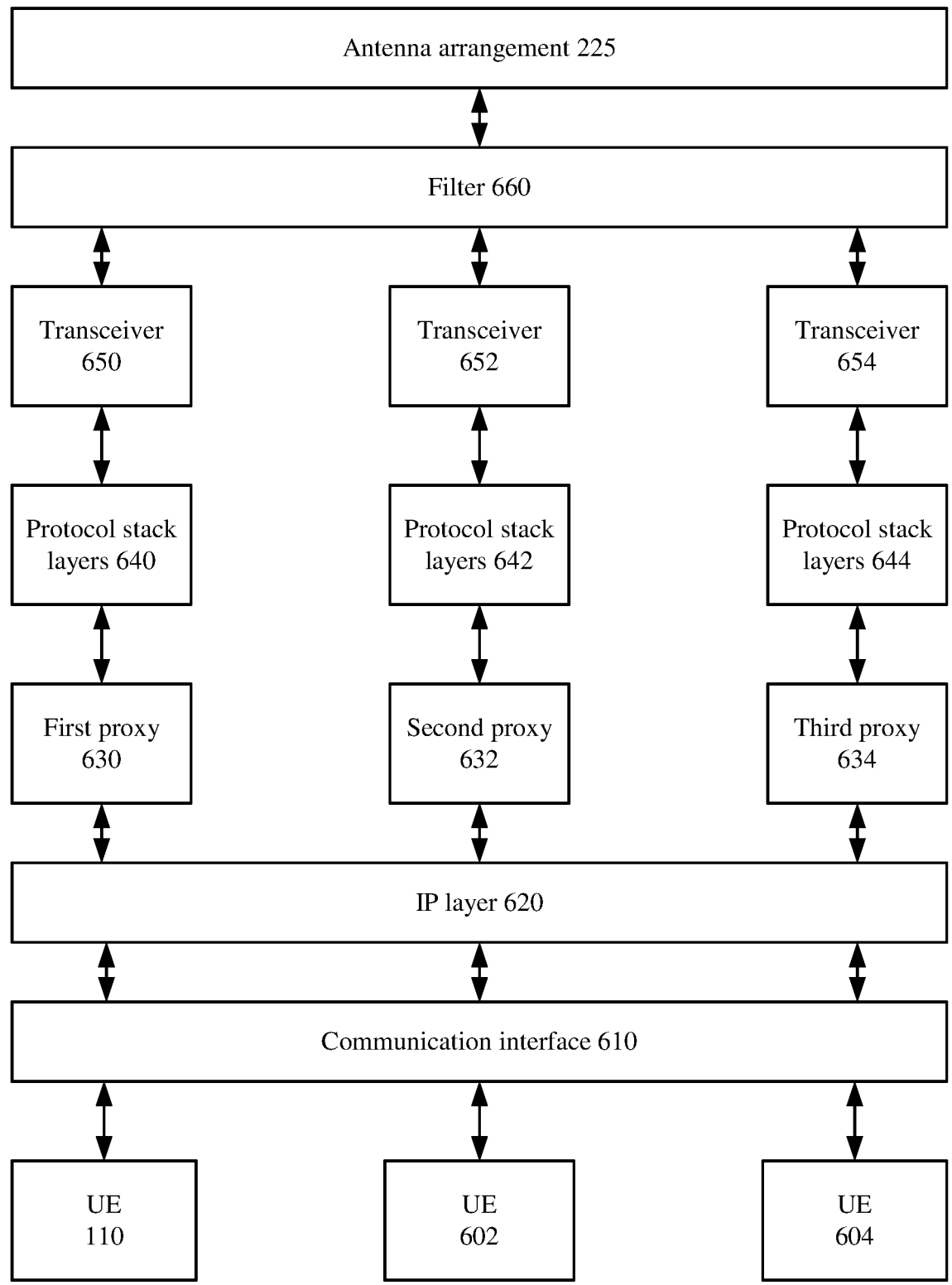
FIG. 6 show an exemplary data flow between the connected car and multiple onboard UEs according to various exemplary embodiments.

FIG. 6 show an exemplary data flow 600 between the connected car 112 and multiple onboard UEs according to various exemplary embodiments. Consider the following exemplary scenario, a first user is driving the connected car 112 to a destination and the first user's UE 110 is onboard. The connected car 112 also includes a second user, the second user's UE 602, a third user and the third user's UE 604. Like the UE 110, the UE 602 and the UE 604 may represent any type of electronic component that is configured to communicate via a network.

Each of the UEs 110, 602, 604 may have an independent WiFi connection with the connected car 112. Thus, data is exchanged between the UEs 110, 602, 604 and the connected car 112 using a communication interface 610. In this example, since the communication interface 610 uses WiFi, data received from the UEs 110, 602, 604 are provided to the IP layer 620 for processing. Data that is to be provided to the UEs 110, 602, 604 via the communication interface 610 may first be provided to the IP layer 620 so the data may be properly formatted to be transmitted via WiFi.

Data for the UE 110 is provided by the IP layer 620 to a first proxy 630. The first proxy 630 may be a driver, within the connected car operating system, configured to manage communications on behalf of the UE 110. Similarly, data for the UE 602 is provided by the IP layer 620 to a second proxy 632 and data for the UE 604 is provided by the IP layer 620 to a third proxy 634.

Data from the first proxy 630 is then processed in accordance with protocol stack layers 640. The protocol stack layers 640 may include, but are not limited to, the packet data convergence protocol (PDCP), the radio link layer (RLC) and the medium access control (MAC) layer. A person of ordinary skill in the art would understand the services provided by these protocol stack layers when data is flowing towards the antenna arrangement 225 and when data is flowing towards the UEs 110, 602, 604. Similarly, data from the second proxy 632 is then processed in accordance with protocol stack layers 642 and data from the third proxy 634 is then processed in accordance with protocol stack layers 644. Reference to the protocol stack layers is merely provided for illustrative purposes. Physical (PHY) layer processing and processing related to any other type of layer in the open systems interconnection (OSI) model may also occur.

Data from the protocol stack layers 640 is the provided to a transceiver 650. For example, if the data is to be sent to a 5G NR RAN, the transceiver 650 may be a 5G NR radio included within the plurality of radios 220. Similarly, data from the protocol stack layers 642 is provided to a transceiver 652 and data from the protocol stack layers 644 is provided to a transceiver 644. In some embodiments, each of the transceivers 640, 642, 644 may be the same transceiver. In other embodiments, one or more the transceivers 640, 642, 644 may be associated with a different RAN. Data is provided from the transceivers 640, 642, 644 to a filter 660. Data is then provided from the filter 660 to the antenna arrangement 625 where it is propagated towards a base station. The exemplary data flow 600 is not intended to limit the exemplary embodiments in any way. Different entities may refer to similar concepts by different names. The exemplary data flow 600 is only provided to demonstrate how a single antenna arrangement 225 may be used on behalf of multiple onboard UEs 110, 602, 604.

The connected car 112 may be configured with a non-shared operating mode and a shared operating mode. In the non-shared operating mode, the connected car 112 will send traffic associated with a particular UE to its corresponding carrier network. For example, with regard to the FIG. 6, data that is to be transmitted by the antenna arrangement 225 of the connected car 112 on behalf of the UE 110 will be sent to the carrier of the UE 110.

In the shared operating mode, the connected car 112 may send traffic associated with a one UE to a carrier associated with a different UE. This allows one UE located at a geographic location in which the carrier associated with that UE does not provide service, to have network connectivity at that geographic location through the carrier associated with a different UE.

For example, consider the following exemplary scenario, the connected car 112 has established a first cellular link with a first carrier on behalf of the UE 110, a second cellular link with a second carrier on behalf of the UE 602 and a third cellular link with a third carrier on behalf of the UE 604. When data that is to be transmitted on behalf of the UE 110 is received by the connected car 112, the connected car 112 may determine which cellular link (e.g., the first cellular link, the second cellular link or the third cellular link) is to be utilized to transmit that data. The selection of the cellular link may be based on factors such as, but not limited to, the quality of each link, the cost of each link and service availability. In some embodiments, the connected car selects a single link. In other exemplary embodiments, the connected car 112 may select multiple cellular links and multiplex all data using the selected cellular links.

When multiple UEs are connected to the connected car 112, the connected car 112 may establish an aggregated virtual data bearer with one of the carriers. The aggregated virtual data bearer may collate all data requests from the multiple UEs connected to the connected car 112. The connected car 112 may select a carrier for the aggregated virtual data bearer based on factors such as, but not limited to, energy per bit, cost per bit, service availability, information received from the network, measurement data collected by the connected car 112, measurement data collected by the UE 110, historical data regarding previous interactions with a carrier under similar circumstances, etc. Thus, with reference to FIG. 6, a single bearer may be used by the connected car 112 for communications performed on behalf of all the UEs 110, 602, 604. From the protocol stack perspective, the application layer may be used for operations such as carrier selection, handover and data recovery for the aggregated virtual data bearer by the carriers or a broker of the connected car 112 subscription. The application layer may implement protocols such as, multipath TCP (MPTCP), IP security (IPsec) and PDCP for managing the aggregated virtual data bearer.

The exemplary embodiments described above with regard to FIG. 5 and FIG. 6 relate to using the data plan associated with one or more UEs for network connectivity. Alternatively, the data plan of the connected car 112 may be used for network connectivity. To improve upon the conventional data plan typically associated with the connected car 112, the exemplary embodiments may implement a connected car data plan broker. The connected car data plan broker may partner with multiple carriers to maximize the coverage area. The connected car 112 may be configured to report data usage information for each UE to the connected car data plan broker. The connected car data plan broker may provide billing and account services on behalf of all users.

To provide an example, a user may be a passenger in the connected car 112. The user may connect their UE 110 to the connected car 112. The connected car 112 may provide the UE 110 with network connectivity using both the hardware of the connected car 112 and the data plan of the connected car 112. At the conclusion of the ride, the connected car 112 may report the data usage of the UE 110 to the connected car data plan broker. The connected car data plan broker may then bill the user of the UE 110 for the data usage.

To provide application layer mobility in this multi-carrier network, the connected car data plan broker may implement overlay networking on top of multiple carriers. Overlay network can be built using a MPTCP proxy and/or a virtual private network (VPN) server using mobile IPsec (MO-BIKE) which is an extension of internet key exchange version 2 (IKEv2) that provides mobility for VPN connections.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

As described above, one aspect of the present technology is the gathering and use of data available from specific and legitimate sources. The present disclosure contemplates that in some instances, this gathered data may include personal information data that uniquely identifies or can be used to identify a specific person. Such personal information data can include demographic data, location-based data, online identifiers, SIM information, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to declare a primary network interface, provision the connected car with an eSIM profile and perform billing/accounting services for data usage. Accordingly, use of such personal information data improves the user experience by enabling carriers to track and bill for data usage.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, tracking data usage may be based on aggregated non-personal information data or a bare minimum amount of personal information.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a connected car configured to perform operations, comprising:
   establishing a connection with a user equipment (UE);
   receiving an embedded subscriber identification module (eSIM) profile corresponding to the UE;

establishing a network connection using the eSIM profile corresponding to the UE;
receiving data from the network over the network connection;
forwarding the data received from the network to the UE via the connection with the UE;
persistently storing the eSIM profile of the UE after the connection has been terminated; and
deactivating the eSIM profile of the UE after the connection has been terminated.

2. The processor of claim 1, wherein the connection with the UE comprises a wired connection or a short-range wireless connection.

3. The processor of claim 1, wherein the operations further comprise:
establishing a connection with a further UE;
receiving an eSIM profile corresponding to the further UE; and
establishing a further network connection using the eSIM profile corresponding to the further UE.

4. The processor of claim 3, wherein the operations further comprise:
receiving data from the UE that is to be transmitted to the network; and
transmitting the data received from the UE to the network over the further network connection.

5. The processor of claim 1, wherein establishing the network connection includes performing a portion of operations to establish the network connection, wherein a remainder of the operations to establish the network connection are performed by the UE.

6. The processor of claim 1, wherein the network connection is a cellular connection.

7. A method performed by a connected car, comprising:
establishing a connection with a user equipment (UE);
receiving an embedded subscriber identification module (eSIM) profile corresponding to the UE;
establishing a network connection using the eSIM profile corresponding to the UE;
receiving data from the network over the network connection;
forwarding the data received from the network to the UE via the connection with the UE;
persistently storing the eSIM profile of the UE after the connection has been terminated; and
deactivating the eSIM profile of the UE after the connection has been terminated.

8. The method of claim 7, wherein the connection with the UE comprises a wired connection or a short-range wireless connection.

9. The method of claim 7, further comprising:
establishing a connection with a further UE;
receiving an eSIM profile corresponding to the further UE; and
establishing a further network connection using the eSIM profile corresponding to the further UE.

10. The method of claim 9, further comprising:
receiving data from the UE that is to be transmitted to the network; and
transmitting the data received from the UE to the network over the further network connection.

11. The method of claim 7, wherein establishing the network connection includes performing a portion of operations to establish the network connection, wherein a remainder of the operations to establish the network connection are performed by the UE.

12. The method of claim 7, further comprising:
receiving data from the UE that is to be transmitted to the network; and
transmitting the data received from the UE to the network over the network connection.

13. A connected car, comprising:
a memory arrangement; and
a processor configured to:
establish a connection with a user equipment (UE);
receive an embedded subscriber identification module (eSIM) profile corresponding to the UE;
store the eSIM profile in the memory arrangement;
establish a network connection using the eSIM profile corresponding to the UE;
receive data from the network over the network connection;
forward the data received from the network to the UE via the connection with the UE;
persistently store the eSIM profile to the memory arrangement; and
deactivate the eSIM profile of the UE after the connection has been terminated.

14. The connected car of claim 13, wherein the connection with the UE comprises a wired connection or a short-range wireless connection.

15. The connected car of claim 13, wherein the processor is further configured to:
establish a connection with a further UE;
receive a further eSIM profile corresponding to the further UE;
store the further eSIM in the memory arrangement; and
establish a further network connection using the eSIM profile corresponding to the further UE.

16. The connected car of claim 15, wherein the processor is further configured to: receive data from the UE that is to be transmitted to the network; and
transmit the data received from the UE to the network over the further network connection.

17. The connected car of claim 13, wherein establishing the network connection includes performing a portion of operations to establish the network connection, wherein a remainder of the operations to establish the network connection are performed by the UE.

* * * * *